(12) United States Patent
Ousterhout et al.

(10) Patent No.: US 7,725,524 B2
(45) Date of Patent: May 25, 2010

(54) PROCESS AUTOMATION SYSTEM AND METHOD HAVING A HIERARCHICAL ARCHITECTURE WITH MULTIPLE TIERS

(75) Inventors: John Ousterhout, Palo Alto, CA (US); Anders Wallgren, Los Gatos, CA (US); Sandeep Tamhankar, Santa Clara, CA (US); Scott Stanton, Menlo Park, CA (US); Usman Muzaffar, Sunnyvale, CA (US)

(73) Assignee: Electric Cloud, Inc., Sunnyvale, CA (US)

( * ) Notice: Subject to any disclaimer, the term of this patent is extended or adjusted under 35 U.S.C. 154(b) by 451 days.

(21) Appl. No.: 11/543,582

(22) Filed: Oct. 3, 2006

(65) Prior Publication Data
US 2008/0148219 A1 Jun. 19, 2008

(51) Int. Cl.
*G06F 9/44* (2006.01)
*G06F 15/173* (2006.01)

(52) U.S. Cl. .................................... 709/201
(58) Field of Classification Search ................ 709/201; 717/101
See application file for complete search history.

(56) References Cited

U.S. PATENT DOCUMENTS

| | | | |
|---|---|---|---|
| 5,325,533 A | 6/1994 | McInerney et al. |
| 5,442,791 A | 8/1995 | Wrabetz et al. |
| 5,500,881 A | 3/1996 | Levin et al. |
| 5,574,898 A | 11/1996 | Leblang et al. |
| 5,692,193 A | 11/1997 | Jagannathan et al. |
| 5,742,778 A | 4/1998 | Hao et al. |
| 6,026,413 A | 2/2000 | Challenger et al. |
| 6,094,528 A | 7/2000 | Jordan et al. |
| 6,237,143 B1 | 5/2001 | Fontana et al. |

(Continued)

FOREIGN PATENT DOCUMENTS

EP 0 859 314 8/1998

OTHER PUBLICATIONS

PCT/US2007/021219 International Preliminary Report on Patentability and Written Opinion of the International Searching Authority, mailed Apr. 16, 2009, 5 pages.

(Continued)

*Primary Examiner*—Wing F Chan
*Assistant Examiner*—Tesfay Yohannes
(74) *Attorney, Agent, or Firm*—Blakely Sokoloff Taylor & Zafman LLP

(57) ABSTRACT

A multi-tiered process automation system employing a novel property attachment mechanism is described. For example, a computer-implemented method according to one embodiment of the invention comprises: providing one or more project objects, procedure objects, and step objects; generating attachment data attaching a plurality of properties to the project objects, procedure objects, and step objects, each of the properties having a value associated therewith, wherein at least some of the properties are generated and attached to the project objects, procedure objects, and step objects at runtime, during execution of the project objects, procedure objects, and step objects, respectively; storing the attached properties with the associated values and attachment data; receiving a request to execute one or more of the objects; interpreting the attachment data to identify the properties attached to each of the one or more objects; and executing the one or more of the objects within the process automation system using the values associated with the one or more properties.

21 Claims, 12 Drawing Sheets

U.S. PATENT DOCUMENTS

| | | |
|---|---|---|
| 6,240,429 B1 * | 5/2001 | Thornton et al. ............ 715/229 |
| 6,457,170 B1 | 9/2002 | Boehm et al. |
| 6,938,252 B2 | 8/2005 | Baylor et al. |
| 6,948,163 B2 | 9/2005 | Melahn et al. |
| 6,988,139 B1 | 1/2006 | Jervis et al. |
| 7,003,759 B2 | 2/2006 | Jameson |
| 7,055,128 B2 | 5/2006 | Porkka |
| 7,100,133 B1 | 8/2006 | Meiyappan |
| 7,197,547 B1 | 3/2007 | Miller et al. |
| 7,437,705 B1 | 10/2008 | O'Bryan |
| 2002/0147855 A1 | 10/2002 | Lu |
| 2002/0199170 A1 | 12/2002 | Jameson |
| 2003/0126118 A1 | 7/2003 | Burton et al. |
| 2003/0126194 A1 | 7/2003 | Kase et al. |
| 2003/0126304 A1 * | 7/2003 | Wyatt ......................... 709/315 |
| 2003/0163799 A1 | 8/2003 | Vasilik et al. |
| 2004/0073904 A1 | 4/2004 | Hill |
| 2004/0205565 A1 | 10/2004 | Gupta |
| 2004/0254919 A1 | 12/2004 | Giuseppini |
| 2005/0097441 A1 | 5/2005 | Herbach et al. |
| 2005/0144610 A1 * | 6/2005 | Zenz .......................... 717/168 |
| 2006/0059253 A1 * | 3/2006 | Goodman et al. ........... 709/223 |
| 2006/0184926 A1 * | 8/2006 | Or et al. ..................... 717/168 |
| 2006/0195508 A1 * | 8/2006 | Bernardin et al. ........... 709/203 |
| 2008/0098369 A1 | 4/2008 | Ousterhout et al. |

OTHER PUBLICATIONS

Free Software Foundation, "GNU Make Manual", Online, Jul. 8, 2002, XP002343577—Retrieved from the Internet on Sep. 5, 2005, URL: http://www.gnu.org/software/make/manual/html.sub.--mono/make.html.

Knutson, J, "Distributed Parallel Build System for Hierarchically Organized Large Scale Software Systems", IBM Technical Disclosure Bulletin, vol. 39, No. 06, (Jun. 1, 1996), 63-68.

Pool, Martin, "distcc User Manual—Chapter 2: Using distcc", Online, Dec. 1, 2002, XP002343569—Retrieved from the Internet on Sep. 5, 2005, URL: http://web.archive.org/web/20021201095253/distcc.samba.org/manual/html/di-stcc-2.html.

PCT Search Report, mailed Jun. 16, 2008, 2 Pages.

Written Opinion, mailed Jun. 16, 2008, 3 Pages.

* cited by examiner

| | | | | | Expand All Collapse All |
|---|---|---|---|---|---|
| ⊟ Job Steps | | | | | |
| Step Name | Status | Elapsed Time (sec.) | Resource | | Actions |
| Extract sources | Success | 0.563 | local | | Details Log |
| ⊟ windows | Success | 3.473 | | | Details |
| Compile | Success | 1.721 | demo-windows | | Details Log |
| Unit test | Success | 1.627 | demo-windows | | Details Log |
| ⊟ solaris | Success | 2.768 | | | Details |
| Compile | Success | 1.174 | demo-solaris | | Details Log |
| Unit test | Success | 1.470 | demo-solaris | | Details Log |
| ⊟ linux | Success | 2.220 | | | Details |
| Compile | Success | 1.188 | demo-linux | | Details Log |
| Unit test | Success | 1.580 | demo-linux | | Details Log |
| Send report | Success | 0.782 | local | | Details Log |

*Fig. 8*

PROCESS AUTOMATION SYSTEM AND METHOD HAVING A HIERARCHICAL ARCHITECTURE WITH MULTIPLE TIERS

BACKGROUND

1. Field of the Invention

This invention relates generally to the field of computer aided software engineering. More particularly, the invention relates to managing distributed processes in a process automation system.

2. Description of the Related Art

Process automation systems are used to perform a variety of computerized tasks. By way of example, software developers use process automation systems to build, test and package software applications. Within this context, the functions performed by these systems may include managing source code; building executable files; executing tests on the software builds; collecting and analyzing diagnostic information related to the builds; and generating detailed reports.

Given the size and complexity of many software projects, "distributed" process automation systems have been developed in which multiple independent jobs are executed concurrently on a set of shared resources (e.g., computer systems). FIG. 1 illustrates one such system developed by BuildForge, Inc. (recently acquired by International Business Machines, Inc). In this system, multiple jobs 101-103 are executed concurrently in response to commands from a Web server 100. A central database 110 enables communication between the jobs 101-103 and allocates resources to each of the jobs upon request. For example, when a job requires access to a particular resource, it opens a connection to the database 110 and executes a query to determine if that resource is available. If the resource is not available, the job waits for a period of time and then checks the database 110 again. Once the resource becomes available, it is allocated to the job and the information needed to complete the job (e.g., source files, environmental variables, etc) is retrieved from the database. The database is then updated to reflect the allocation of the resource to the new job.

SUMMARY

The embodiments of the invention described herein employ sophisticated techniques for managing distributed processes in a process automation system. Specifically, one embodiment of the invention implements a general purpose property mechanism in which arbitrary data is attached to any object in the system (e.g., projects, procedures, jobs, job steps, resources, etc), thereby providing a convenient way to configure the system without modifying the underlying program code. In addition, in one embodiment, a three-tier hierarchy of data object is employed: "projects," "procedures," and "steps" (or "projects," "jobs" and "job steps" during runtime). A property may be attached to any object on any tier of the hierarchy to configure that object and (potentially) all of the objects which reference the property. The properties and property sheets may be attached both statically (before runtime) and dynamically (during runtime). Moreover, one embodiment of the invention employs a unique property substitution syntax to allow the value for a particular property to be located and substituted dynamically at runtime.

In addition, advanced report generation techniques are described below in which the report generation process is logically separated into a data gathering stage and a report generation stage. The data gathering stage extracts certain specified properties and diagnostic information from each job step. The extracted information is then stored in a highly flexible, reusable data format which is used to create different types of user-configurable reports.

BRIEF DESCRIPTION OF THE DRAWINGS

A better understanding of the present invention can be obtained from the following detailed description in conjunction with the following drawings, in which:

FIG. 8 illustrates a second report generated in accordance with one embodiment of the invention.

DETAILED DESCRIPTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

A System and Method for Managing Distributed Processes in a Process Automation System The embodiments of the invention described below employ sophisticated techniques for managing distributed processes in a process automation system. Specifically, one embodiment of the invention implements a general purpose property mechanism in which arbitrary data is attached to any object in the system (e.g., projects, procedures, jobs, job steps, resources, etc), thereby providing a convenient way to configure the system without modifying the underlying program code. In addition, in one embodiment, a three-tier hierarchy of data object is employed: "projects," "procedures," and "steps" (or "projects," "jobs" and "job steps" during runtime). A property may be attached to any object on any tier of the hierarchy to configure that object and (potentially) all of the objects which reference the property. The properties and property sheets may be attached both statically (before runtime) and dynamically (during runtime). Moreover, one embodiment of the invention employs a unique property substitution syntax to allow the value for a particular property to be located and substituted dynamically at runtime.

In addition, advanced report generation techniques are described below in which the report generation process is logically separated into a data gathering stage and a report generation stage. The data gathering stage extracts certain specified metrics and diagnostic information from each job step. The extracted information is then stored in a highly flexible, reusable data format which is used to create different types of user-configurable reports.

1. System Architecture

Figure 1:
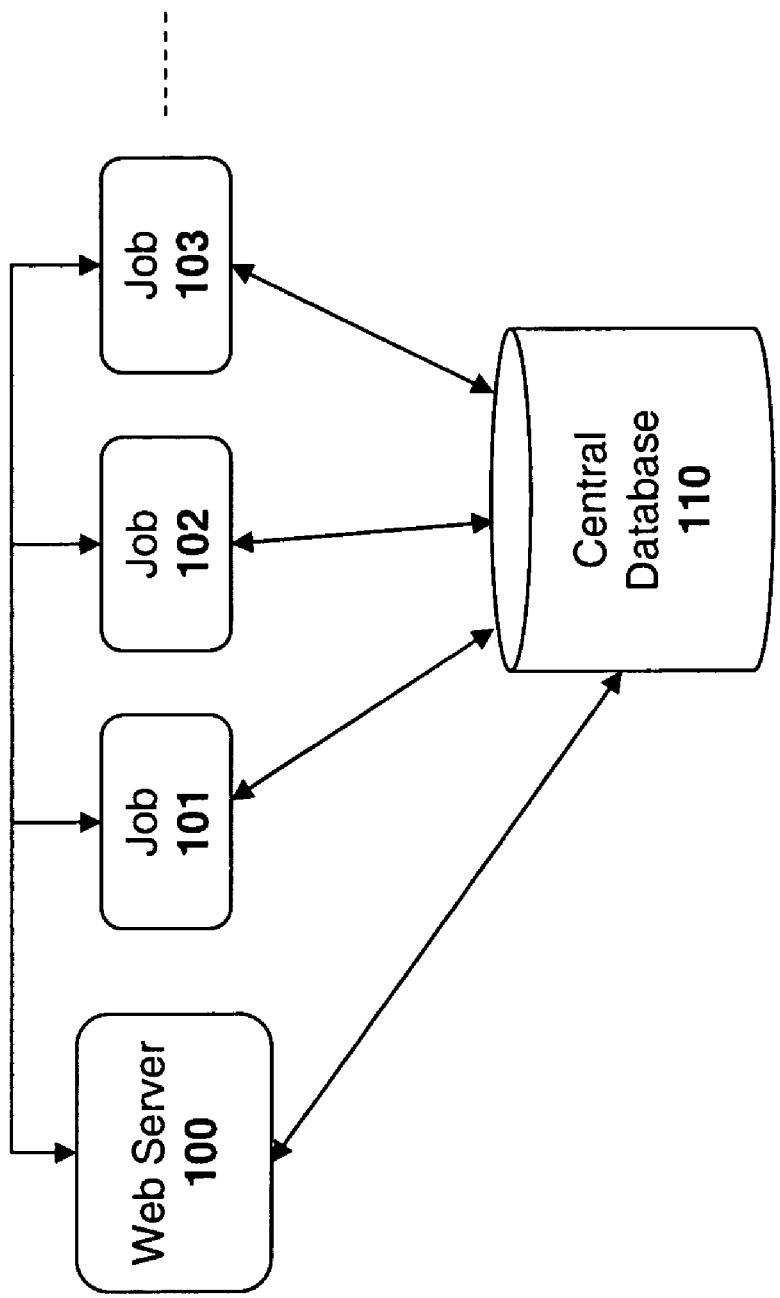
FIG. 1 illustrates an exemplary prior art distributed process automation system.
Figure 2A:
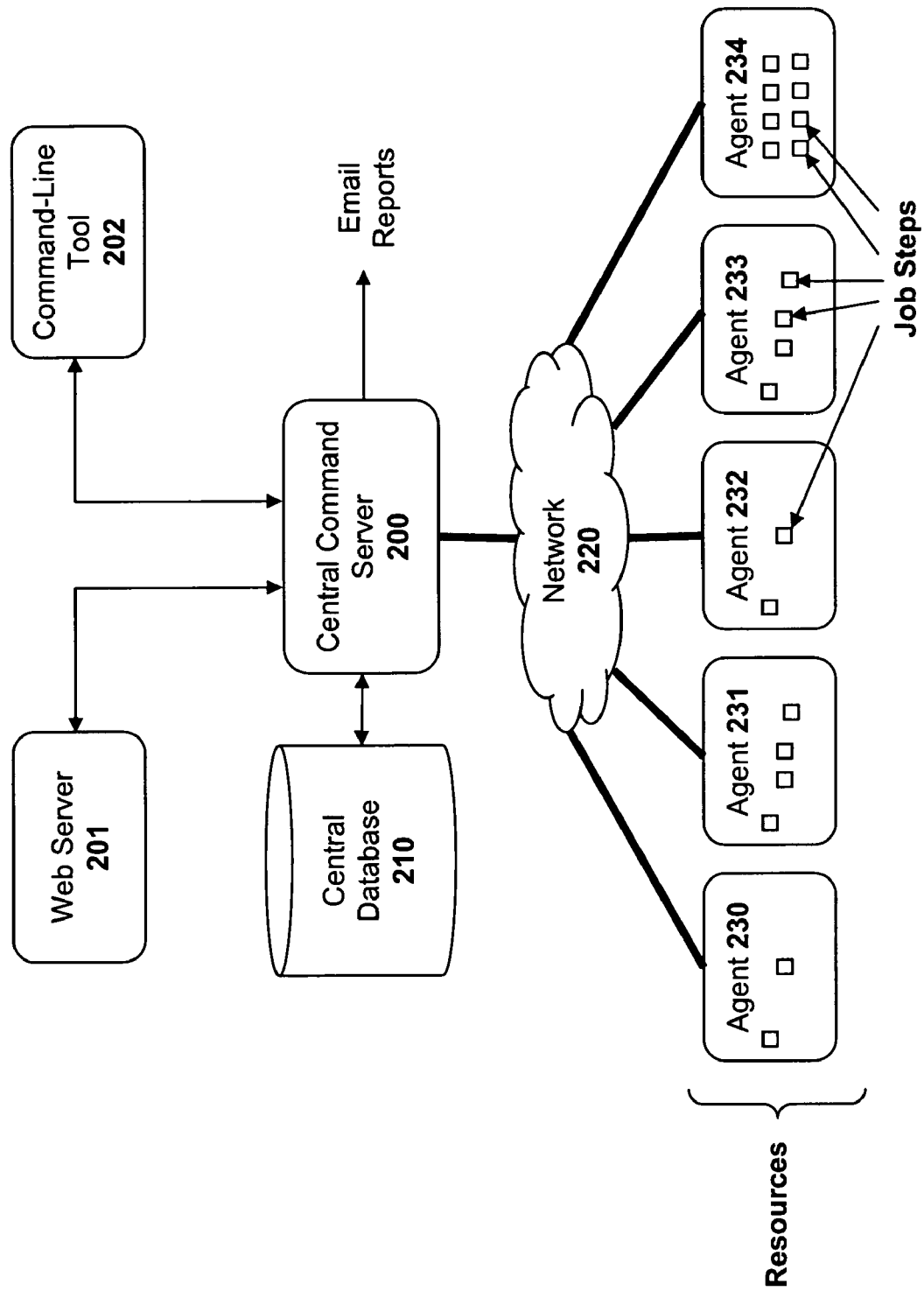
FIG. 2a illustrates a system architecture according to one embodiment of the invention.

FIG. 2a illustrates a system architecture according to one embodiment of the invention which includes a central command server 200, a Web server 201, a central database 210, a command line tool 202, and a plurality of system agents 230-234 (sometimes referred to as system "resources") which communicate with the central command server over a network 220.

Figure 2B:
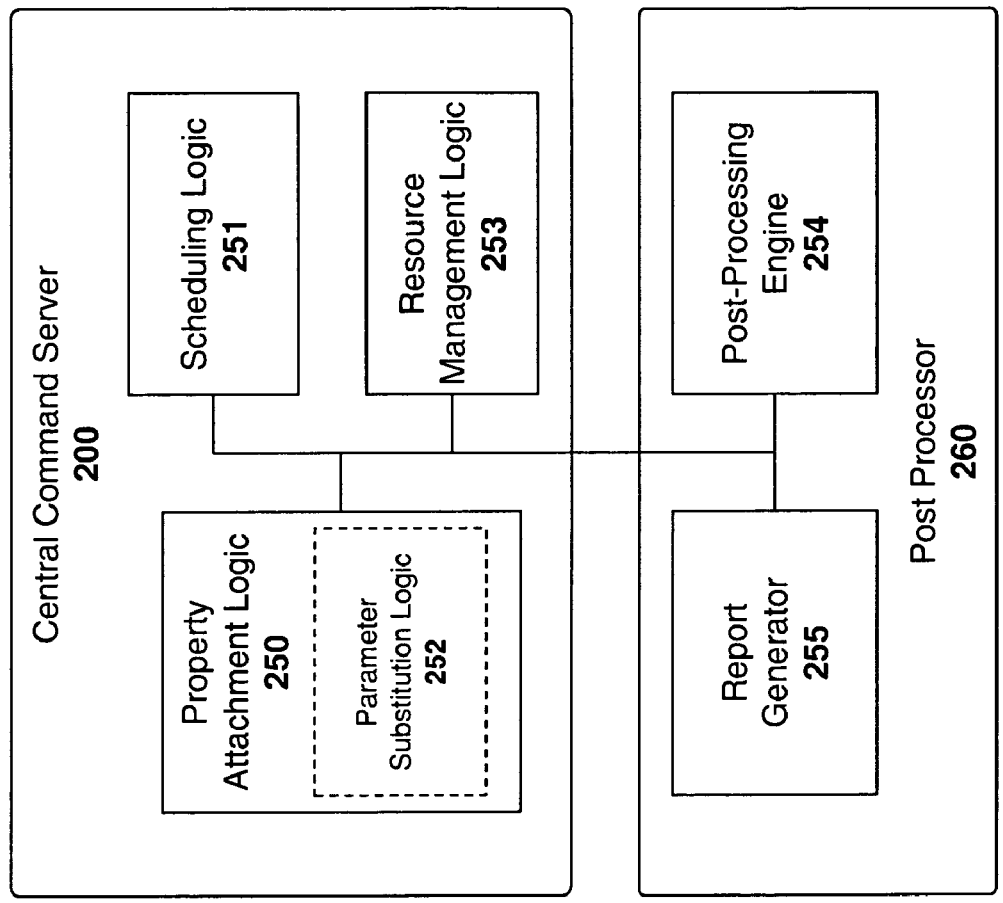
FIG. 2b illustrates a central command server according to one embodiment of the invention.

The central command server 200 implements the various property management techniques described below and acts as a central arbiter for access to both the central database 210 and the system agents 230-234. As illustrated in FIG. 2b, the central command server 200 includes property attachment logic 250 for executing the property attachment mechanisms described herein; parameter substitution logic 252 for substituting parameters within projects, procedures, jobs, and steps using properties; scheduling logic 251 for executing jobs on the agents 230-234 based on a predefined execution schedule; and resource management logic 253 for continually monitoring the state of each of the agents 230-234 and initiating new jobs only when resources for those jobs are available. FIG. 2b also illustrates post-processing logic 260 comprised of a post-processing engine 254 for gathering and processing data related to the execution of each job step; and a report generator 255 for generating associated reports. The details of each of these system components will be described in detail below.

Figure 2C:
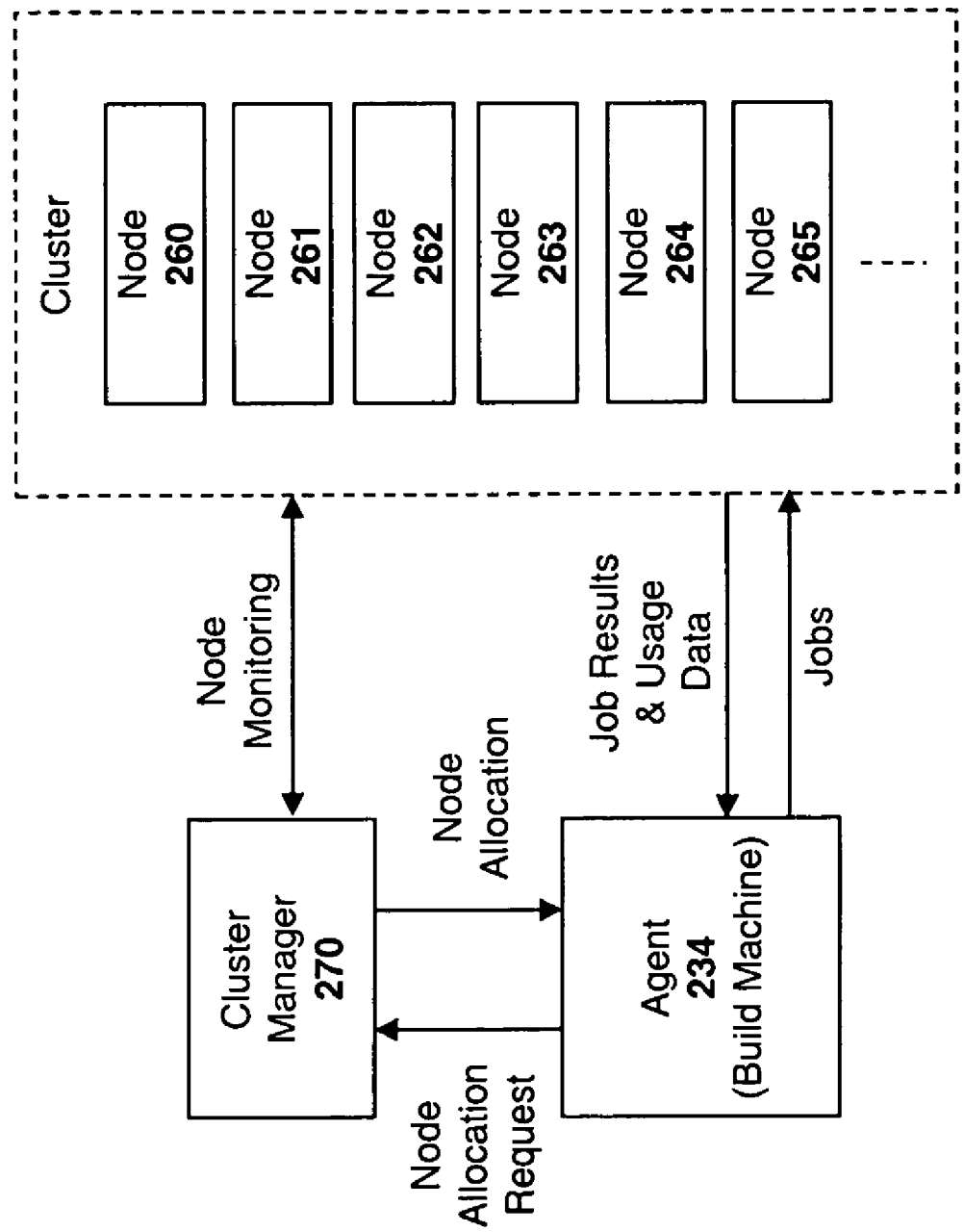
FIG. 2c illustrates one embodiment of the invention in which one or more of the agents are configured as build machines for performing program builds.
Figure 2D:
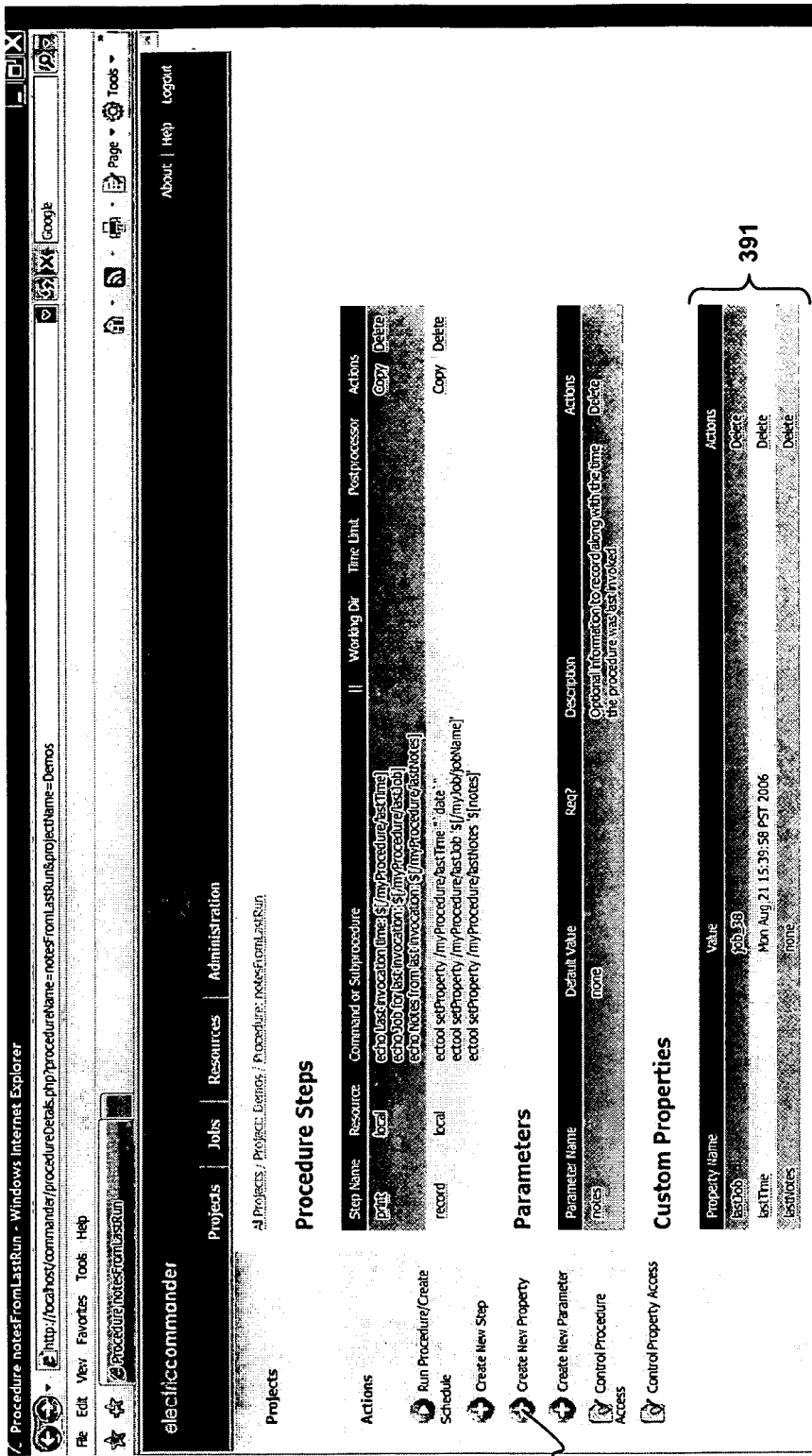
FIG. 2d illustrates a Web-based graphical user interface employed in one embodiment of the invention.

Returning again to FIG. 2a, the Web server 201 provides a graphical Web-based interface to control the central command server. For example, the Web server 201 allows users to enter execution schedules (e.g., nightly builds, tests, etc); manually initiate projects and procedures; associate properties (and property sheets) with objects; and review logs and reports. An exemplary Web-based user interface is illustrated in FIG. 2d which includes a listing of each of the custom properties 391 associated with a particular procedure. A "create new property" link 290 is provided to allow the user to specify additional properties and attach the properties to the procedure. In one embodiment, when the link 290 is selected, the user is provided with a set of data entry fields (not shown) in which to enter the name/value pairs for each property.

The command line tool 202 provides similar functionality to the Web server but using shell commands rather than graphical user interface elements. It should be noted, however, that the underlying principles of the invention are not limited to any particular type of user interface.

In one embodiment of the invention, the central database 210 is a relational database such as those currently available from Oracle, Microsoft, and IBM. In another embodiment, the MySql database is used. Thus, in one embodiment, the central command server 200 communicates with the central database 210 using standard Relational Database Management System (RDBMS) commands and queries. However, virtually any type of database system may be employed while still complying with the underlying principles of the invention.

The central database 210 stores information about all of the objects in the system such as projects, procedures, steps, schedules, and jobs. Information stored in the database falls into four general classes: a description of the various processes to be executed (procedures, steps, etc); information about when to execute the various processes (schedules); and information about the results of executing processes (results of the jobs and job steps); and administrative information such as information related to users and groups.

In one embodiment of the invention, the network 220 is an Ethernet network for coupling the central command server to each of the agents 230-234 (e.g., a 100 Mbit/s or 1000 Mbit/s network). However, virtually any network hardware or protocols may be used. One particular implementation runs over TCP/IP, and uses HTTP for the basic exchange mechanism, with XML used to represent the data in the messages.

The agents 230-234 may be heterogeneous servers, equipped with different operating systems and/or processing capabilities. For example, the agents 230-234 may include Solaris machines, Windows machines (e.g., Windows XP, 2003, etc), and Linux machines. The particular type of machine on which a job is to execute may be specified by the user via the Web server 201 and command-line tool 202 and/or may be selected automatically by the central command server 200 based on the resource requirements of the job. Although only five agents are illustrated in FIG. 2a, virtually any number of agents may be coupled to the system while still complying with the underlying principles of the invention.

One or more of the agents 230-234 may be configured as "build machines" for performing program builds in response to commands from the command server 200 and/or the user. FIG. 2c illustrates one such implementation in which an agent 234 initiates and controls a program build by executing jobs in parallel across a series of nodes 260-265. The cluster manager 270 illustrated in FIG. 2c monitors the status of each of the nodes and allocates nodes to the build machine 234 upon request. The cluster manager 270 may be implemented as a module within the central command server 200.

In one embodiment, the build machine 234, cluster manager 270 and nodes 260-265 operate as described in U.S. Pat. No. 7,086,063, Ser. No. 10/397,139, entitled SYSTEM AND METHOD FOR FILE CACHING IN A DISTRIBUTED PROGRAM BUILD ENVIRONMENT, which is assigned to the assignee of the present application and which is incorporated herein by reference. One additional implementation in which source files are exchanged directly between nodes is described in the co-pending patent application entitled A SYSTEM AND METHOD FOR INTELLIGENTLY DISTRIBUTING SOURCE FILES WITHIN A DISTRIBUTED BUILD ENVIRONMENT, Ser. No. 10/715,974, Filed Nov. 17, 2003, which is also assigned to the assignee of the present application and which is incorporated herein by reference.

2. Property Attachment and Management

As mentioned above, the property attachment logic 250 within the central command server 200 implements a general purpose property mechanism in which arbitrary data may be attached to any object in the system. One exemplary multi-tiered architecture, illustrated in FIG. 3a, includes a "resource" object 302 with a group of attached properties 303a-b and a "project" object 304 with a group of attached properties 305a-b.

The resource object 302 represents a particular resource in the system (e.g., a particular agent 230-234) and the properties 303a-b associated with the resource object 302 are values defining attributes of the resource. For example, property 303a may represent a particular platform (e.g., Solaris) and property 303b may represent a version number (e.g., version 3.4). Various other resource-specific properties may be attached to the resource object 302 while still complying with the underlying principles of the invention (e.g., memory size, processor type/speed, last job executed on the resource, etc).

Figure 3A:
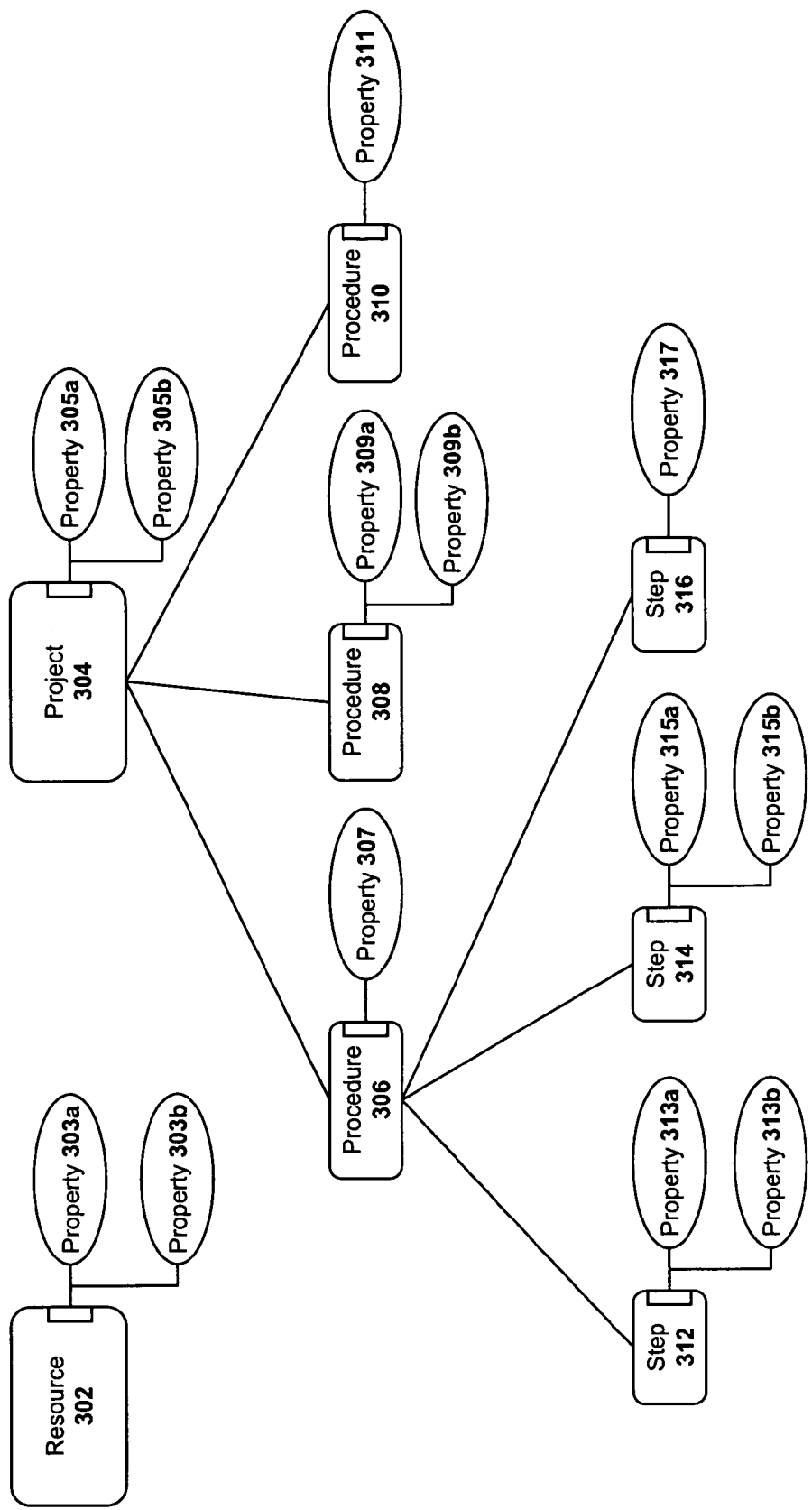
FIGS. 3a-b illustrate property attachment mechanisms employed in one embodiment of the invention.

The project object 304, which is at the top of the multi-tier hierarchy mentioned previously, represents a particular project designed by a user. The project may include one or more "procedures" and each procedure may include one or more "steps." Thus, each project object 304 is associated with one or more "procedure" objects 306, 308, 310 which represent procedures to be executed on the system resources (i.e., the agents 230-234). Similarly, each procedure object is associated with one or more "step" objects 312, 314, 316, which represent one or more commands to be executed by the system resources. As indicated in FIG. 3*a*, properties 307, 309*a-b*, 311 and 313*a-b*, 315*a-b*, 317 may be associated with the procedure objects 306, 308, 310 and step objects 313, 314, 316, respectively. The central command server 200 manages the property attachment process using the central database 210. Specifically, in one embodiment, tables are maintained within the central database 210 which contain steps, procedures, projects, properties, and properties.

The container objects that associate the properties for a particular object are referred to as "property sheets." The tables managed by the database mimic the hierarchy illustrated in FIG. 3*a*. Each object in the system has a property sheet associated with it by default. Project objects 304, for example, are stored in the database with their property sheets. Database joins are used to attach a particular object to a property sheet that stores its properties. A property is attached to a particular object by specifying the property name and the object name to the central command server 200 (e.g., "set property X on object Y"). The central command server 200 then "attaches" the property to that object.

Figure 4:
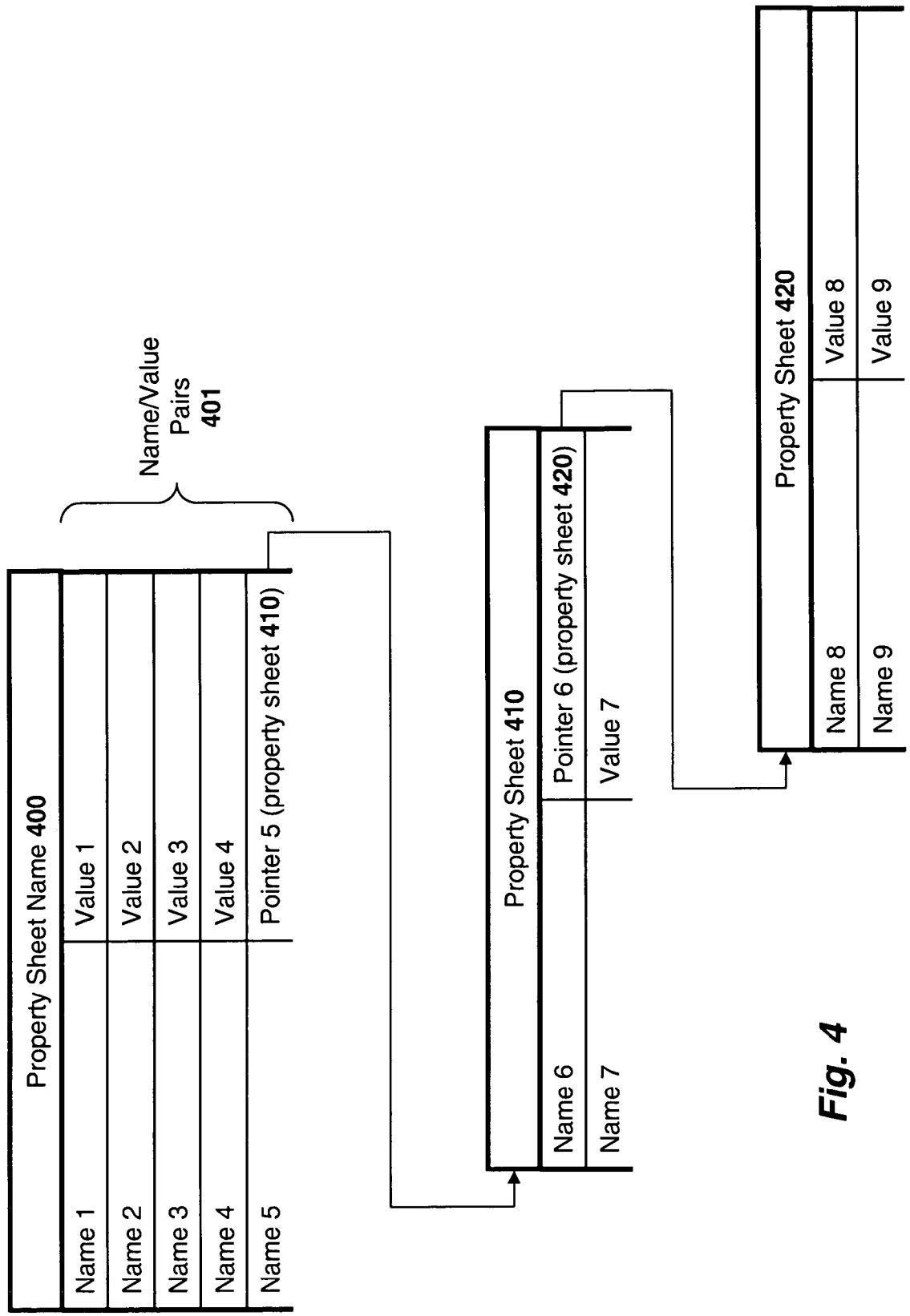
FIG. 4 illustrates a property sheet hierarchy employed in one embodiment of the invention.

FIG. 4 illustrates the structure of an exemplary property sheet as well as the hierarchical relationships which may exist between property sheets. As illustrated, a property sheet 400 is identified by its name and is comprised of a series of name/value pairs 401. The names/values represent the properties associated with a particular object (e.g., version number, resource type, etc). Certain entries within a property sheet may point to other property sheets. In FIG. 4, for example, the entry identified by "Name 5" includes a pointer, "Pointer 5," which points to property sheet 410. Similarly, property sheet 410 includes an entry identified by "Name 6" which includes a pointer, "Pointer 6" which points to property sheet 420. Thus, hierarchical relationships between property sheets are defined using pointers which point to other property sheets.

In one embodiment, the hierarchical relationships between the objects are used to identify the properties associated with the objects. Objects lower in the hierarchy use properties attached to objects further up the hierarchy. For example, in FIG. 3*a*, each of the steps 312, 314, 316 use property 307 attached to procedure 306. Thus, if the property 307, for example, specifies a particular repository for source code (e.g., repository.P4.electric.com), each of the steps will use that repository. Similarly, if the property 307 specifies a particular platform (e.g., Linux), then each of the steps will use that platform. Moreover, all of the procedures and steps under project 304 will use its properties 305*a-b*.

In one embodiment, if a particular property is attached to both an object lower in the hierarchy and an object higher in the hierarchy, then the value specified by the object lower in the hierarchy will be used instead of the value specified by the object higher in the hierarchy. For example, in FIG. 3*a*, if properties 317 and 307 have the same name, then the value of property 317 will be used in place of the value of property 307.

Figure 3B:
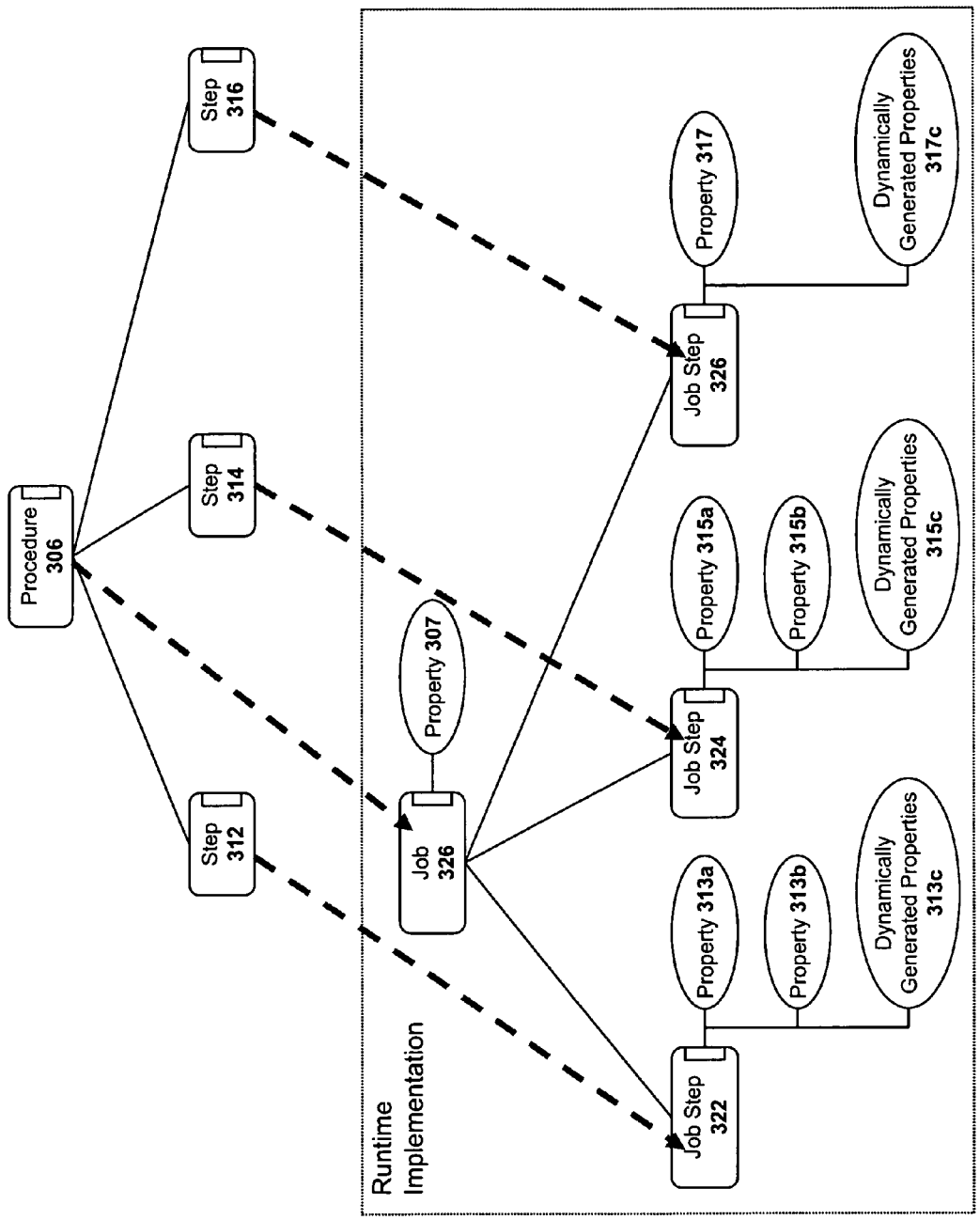

As used herein, a "job" is a runtime implementation of a procedure—i.e., it is an "instance" of that procedure. Similarly, a "job step" is a runtime implementation of a procedure step. This relationship is illustrated generally in FIG. 3*b* in which job 326 is a runtime instance of procedure 306 and job steps 322, 324, 326 are runtime instances of steps 312, 314, 316, respectively.

In one embodiment of the invention, properties 313, 313*b*, 313*c*, 315*c*, 317*c* are dynamically generated and attached to jobs, job steps and/or other objects during runtime (i.e., rather than statically, prior to runtime). The dynamically generated properties may be used for a variety of purposes including data collection during execution, passing information between jobs/job steps during execution and setting parameters within jobs and job steps prior to execution.

By way of example, during runtime, a job step may be programmed to attach a first property identifying the time that the job step started executing and a second property indicating the time that the job completed execution. Similarly, if the job step is involved in a program build operation, the job step may attach/update properties which indicate the number of compiles executed, the number of tests run, the number of errors or warnings triggered, etc, after the job step has completed executing. In one embodiment of the invention, this information is collected by the central command server 200 and stored back into the central database 210 upon completion of the job step. The collected information may then be used for analysis and report generation following the completion of a project (as described in greater detail below).

In addition, in one embodiment of the invention, the property mechanism may be used to pass information between jobs, job steps and other objects during runtime and/or prior to runtime. For example, if two or more job steps need to be executed on the same resource, then the first job step may dynamically attach a property identifying the resource. The property will then be used by the other job steps to identify the resource on which to execute. Similarly, if the other job steps rely on the start time of the first job, then the first job may dynamically attach a property indicating the start time. The properties may be attached to the individual job steps or to the job with which the job steps are associated. A virtually unlimited number of different types of properties may be set by job steps in this manner.

In addition, in one embodiment, parameters may be set prior to the execution of a job or job step. As used herein, a "parameter" is a special type of property which is substituted by the server at job creation time and is unique to the job. For example, a user may wish to run a job or job step on a particular version of software and/or on a particular platform (e.g., Solaris, version 3.14). As such, the user may pass in a parameter prior to execution which is stored as a property of the job. Upon execution, the job and/or job step is executed with the new set of parameters.

3. Property Substitution

Figure 5:
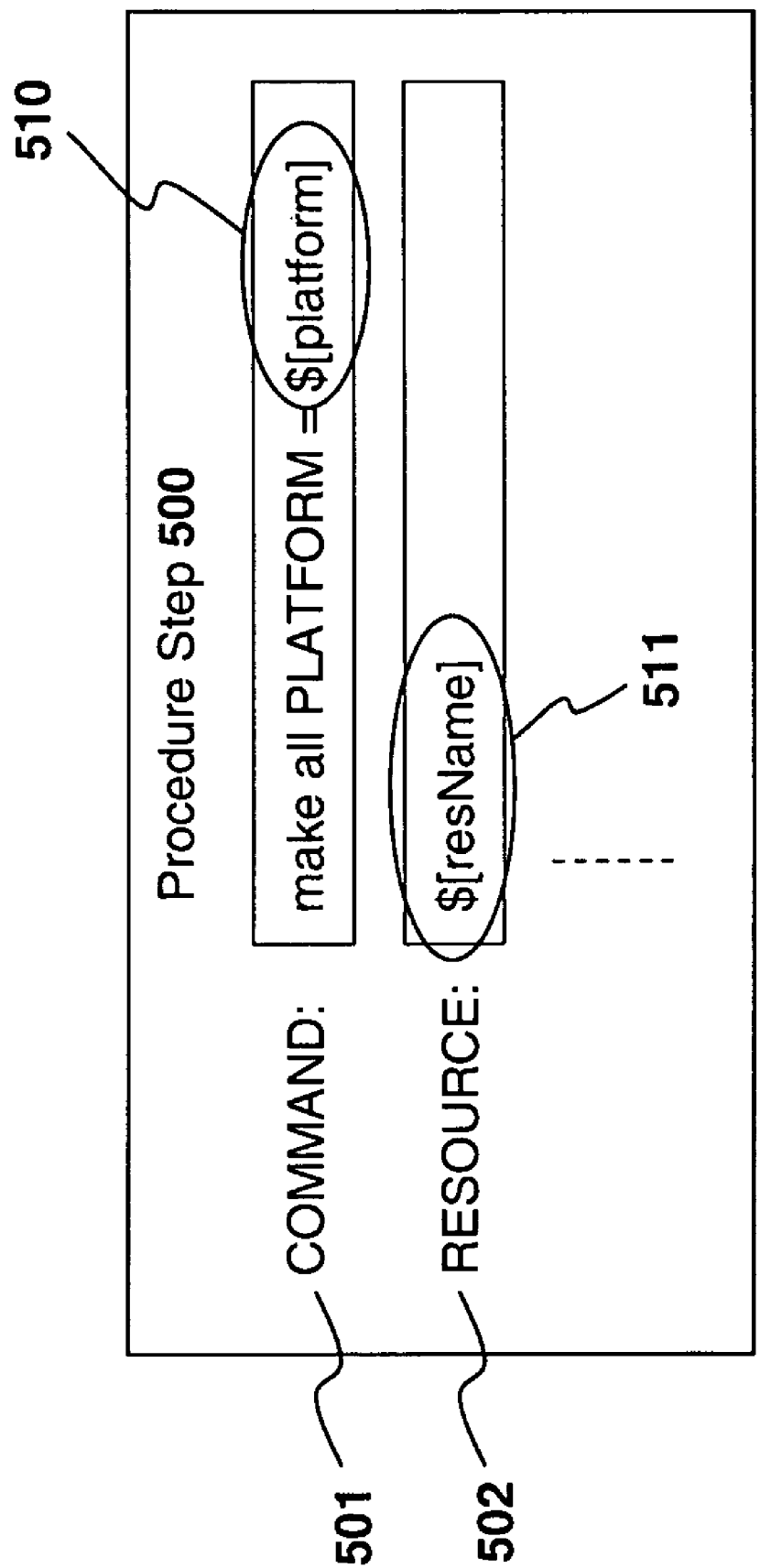
FIG. 5 illustrates a parameter substitution syntax employed in one embodiment of the invention.

As mentioned above, one embodiment of the invention includes property substitution logic 252 for substituting property values from procedure steps to job steps during runtime using a unique substitution syntax. As illustrated in FIG. 5, when a procedure step 500 is defined, it typically includes at least one command to be executed 501 and a resource on which to execute the command 502. The values of the commands and resources may be specified explicitly or, alternatively, the substitution syntax may be employed to generate the values dynamically at runtime by combining property values with fixed text.

For example, as illustrated in FIG. 5, the syntax $[string] instructs the property substitution logic 252 to find the value of the property which is referenced inside of the brackets and use that value in place of the $[string] entry. Thus, before using any of the string values, the property substitution logic 252 scans through the job step 500 and wherever it sees the $[string] syntax, it searches for and substitutes the value. In the illustrated example, when it locates the platform property, it makes the substitution within the job step. Similarly, the parameter substitution logic 252 searches for a Resource Name property and, when located, replaces the $[resName] entry with the identity of a physical resource on the system. Consequently, specific parameters do not need to be hard-coded as part of the job step, thereby creating greater flexibility and making the code re-usable with virtually unlimited number of parameters. For example, the command "make all PLATFORM=$[plat]" is expanded to "make all PLATFORM=windows" if the property $[plat] is equal to "windows".

In one embodiment, the properties described above are stored in one or more property sheets within the central database 210. Thus, using the foregoing architecture, procedures are parameterized and stored within the central database 210.

The foregoing architecture is useful in a variety of circumstances. For example,(a first step in a job may be configured to attach a time limit property which is respected by all other steps. A job step may also be configured to invoke another procedure, the name of which is stored in the system as a property. These specific examples are, of course, merely provided for the purpose of explanation. The underlying principles of the invention are not limited to any particular application.

In addition, in one embodiment of the invention, a hierarchical naming system is employed to identify a specific point in the hierarchy in which to look for a property (rather than merely lookup up the hierarchy). For example, the format $[/projects/foo/procedures/bar/xyz] uses slashes to separate different property sheets. In response to detecting this syntax, the parameter substitution logic 252 searches through projects to find project foo; searches through procedures within foo to identify the procedure named bar; and then identifies the value in that procedure for property xyz. The property substitution logic 252 then substitutes that value within the job step.

In one embodiment, the substitution syntax uses starting points, or "roots" which indicate where to lookup the first element in the property pathname. For the sake of convenience, a variety of roots may be defined such as "/projects," "/myResource," and "/myJob." In one embodiment, if a root is not specified, then one is implied from the context. For example, if the property "foo" is requested from within a running job step, then the command server starts in the job step and searches up the hierarchy as described above. Similarly, when expanding the value of a procedure parameter the property attachment logic 250 may first look for the named property in the procedure for which the parameter is defined. If it is not found there then the property attachment logic 250 searches in the project containing the procedure. Moreover, when expanding a property for a job step, it may first look in the job step, followed by the parameters for the job, then in the global properties for the job. Thus, different search paths may be defined depending on the context in which the substitution is occurring.

Various generic system attributes may be identified in this manner. For example, like myResource (mentioned above), myJob identifies the current job, myProcedure identifies the current procedure; and myProject identifies the current project. Each of these attributes will have a different value depending on the current execution context. In one embodiment, words identifying these system attributes are reserved by the system (i.e., so that users cannot create jobs with these names).

In one embodiment, the notion of "property" is generalized to include not just the extra custom information that users specify, but built-in system information as well. For example, the central command server 200 defines a field for each resource, "resourceName," that contains the name of the resource. In one embodiment, this field may be accessed in the same way as a user-defined property, e.g., "/myResource/resourceName." Moreover, each procedure, step, etc, appears as a property sheet, whose individual properties include both the built-in system values and any user-defined values. The term "attribute" is sometimes used herein when referring to a built-in value to distinguish it from a custom property. In sum, all of the information in the system (projects, procedures, schedules, jobs, and so on) appear to be linked to a single, large hierarchical property sheet that contains all of the properties and attributes. This is valuable in that it provides a single, uniform mechanism for accessing all of the information in the system.

Thus, all of the configuration information within the system and the content of the objects themselves may be accessible as properties using the same notation, providing great flexibility in the way the system can be managed. Moreover, using the "my" syntax, a step does not need to known the name of its procedure; rather, this information can be determined at runtime. Consequently, the job step will still run correctly even if the procedure name is changed.

In addition, in one embodiment of the invention, if the value of a property that is actually a property sheet is read, a description the entire sheet (and all of its descendents) is provided to the reader. If this value is then assigned to another property name, that property will now become a property sheet whose contents (and descendents, etc.) duplicate the contents of the original read property. This feature provides a simple mechanism for copying aggregates of data from one place to another.

4. Data Gathering and Reporting

As previously mentioned, one embodiment of the invention includes post-processing logic 260 comprised of a post processing engine 254 for collecting and formatting data from each job step and report generation logic 255 for generating reports using the formatted data. The postprocessor 260 runs on the same machine as the job step whose output it is analyzing, and it runs after the job step itself completes. In operation, the Job Step 601 will produce a log file 603 containing an indication of the commands which executed during the execution of the job step and the results (e.g., compiles, tests failed, tests passed, tests skipped, warnings, errors, etc). Often, useful information is embedded within the log file 603 but it is difficult to identify. For example, a user may be interested in specific errors or warnings which occurred during the execution of the job step but, in order to locate this information, the user must perform a manual search for specific text or other specific data patterns within the log file 603.

Figure 6:
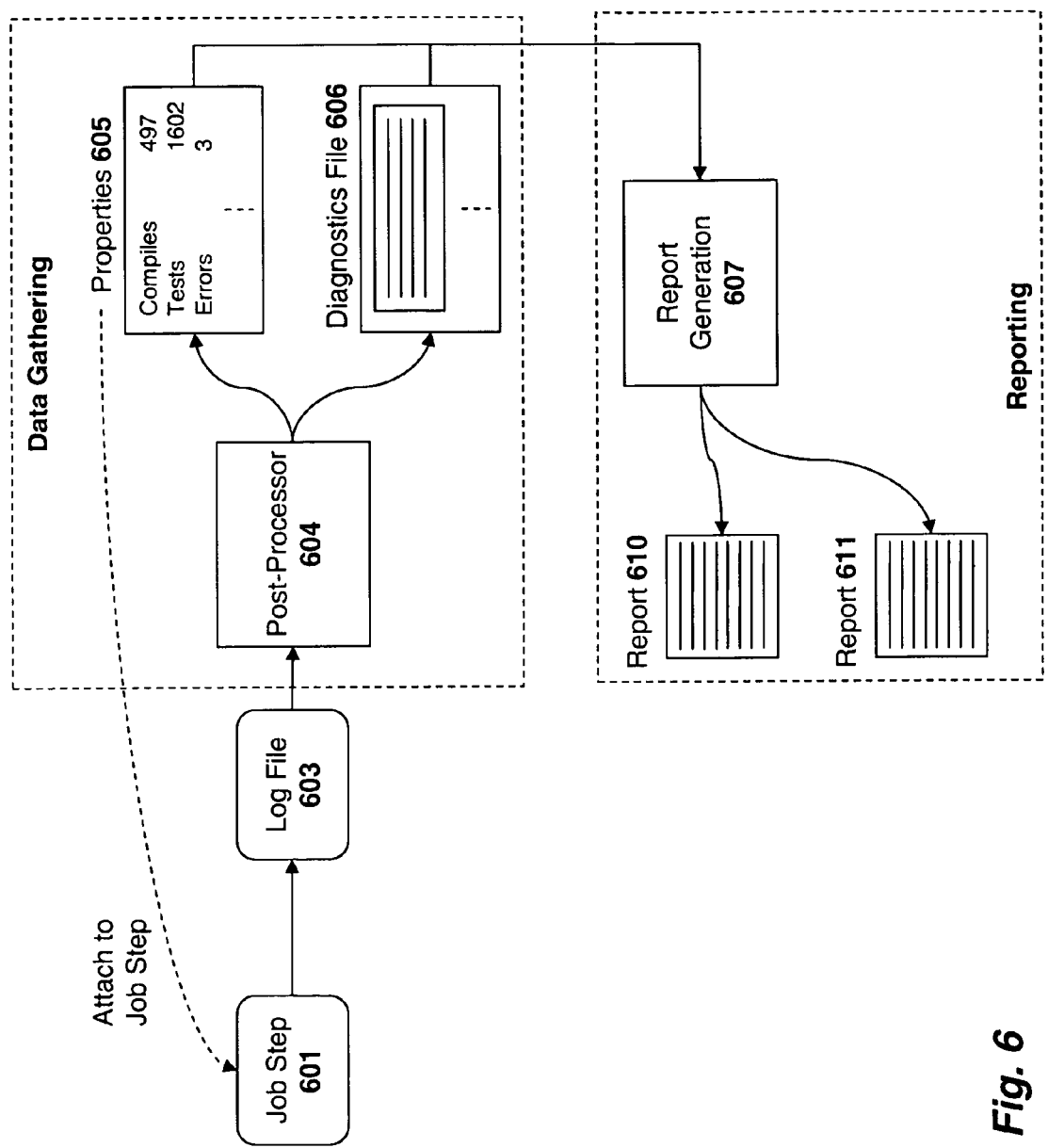
FIG. 6 illustrates data gathering and report generation employed in one embodiment of the invention.

To address the foregoing issues, a post processor 604 scans through the log file 603 at the end of each job step, extracts the useful information from the log file 603, and stores the extracted information in a highly flexible, reusable data format. Specifically, as illustrated in FIG. 6, the post processor 604 generates a set of properties 605 and a diagnostics file 606. The set of properties 605 comprises user-specified variables which are particularly relevant to the job step 601. In the case of a program build operation, for example, the properties may include the number of compiles which executed, the number of tests run, and the number of errors and warnings. Once collected, the set of properties are then stored as a property sheet and attached to the job step 601 (as described above).

To generate the diagnostics file 606, the post processor 604 extracts detailed blocks of information form the log file 603 which are related to one or more of the extracted properties. For example, in the case of a test failure, the post processor 604 may extract all of the information related to the reason for the failure and any additional pertinent information (e.g., such as the platform on which the failure occurred). In one embodiment, the diagnostics file 606 is an XML file; however, any convenient file format may be used. In an alternate embodiment, the diagnostics file 606 information is stored as a set of properties within the central database 210.

In one embodiment, in order to identify the "useful" information, the post processor 604 searches for specific strings and/or other data patterns within the log 603. By way of example, to identify a compile, the post processor may search for strings indicating a compile operation (e.g., cl followed by a space for the Microsoft C compiler). Similarly, a first instance of the word "failed" in combination with another sequence of characters may indicate the start of information related to a test failure and a second instance of the word "failed" in combination with the sequence of characters may indicate the end of the information related to the test failure. Thus, in one embodiment, the post processor 694 extracts all of the information contained between the two instances of the word "failed." This is, of course, merely one example of how the post processor identifies the useful information within the log file. Various other well known pattern matching techniques may be employed to identify the useful information while still complying with the underlying principles of the invention.

Figure 7:
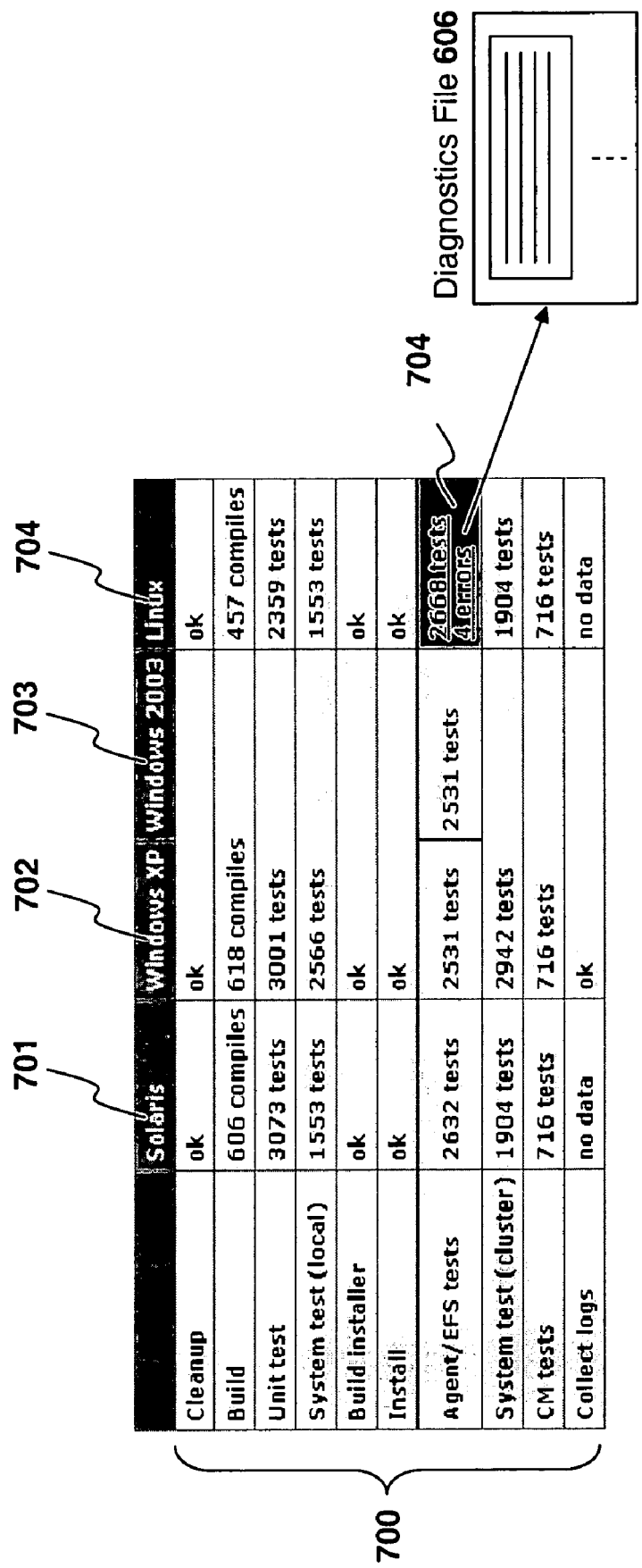
FIG. 7 illustrates a first report generated in accordance with one embodiment of the invention.

Once the properties 605 and diagnostic file 606 have been generated for each job step, the report generation logic 607 combines the information from both files to generate different types of reports 610-611. For example, the report generation logic may organize the properties in a high-level summary report containing links to the more detailed information from the diagnostic file 606. One particular type of report, illustrated in FIG. 7, is a table with separate columns 701-704 for each type of platform and separate rows 700 for each job step. In the specific example shown in FIG. 7, a separate column is provided for a Solaris platform 701, a Windows XP platform 702, a Windows 2003 platform, and a Linux platform 704. Thus, each cell within the table represents the results of a different step executed on a different platform. The cells may be color-coded to indicate the results of each of the steps. For example, in one embodiment, warnings are colored yellow, errors are colored red, successful operations (e.g., tests and compiles) are colored green, and steps which were not performed on a particular platform (e.g., the "no data" cells in FIG. 7) are colored gray. In one embodiment, the report generation logic 607 reads properties from multiple steps to produce its report.

In addition, as indicated in FIG. 7, hyperlinks are inserted within certain cells that point to more detailed information from the diagnostics file 606. Referring again to the above example, the hyperlink is configured to point to the complete information related to a particular error, failure or warning within the diagnostics file. Similar hyperlinks may be embedded to point to other pertinent information within the diagnostics file (successful tests, compiles, etc).

Another type of report is illustrated in FIG. 8. In contrast to the summary report illustrated in FIG. 7, this report provides a more detailed, serial representation of each of the executed job steps and the associated results (e.g., start time, how long each job ran, commands executed, resources the job executed on, arguments for each procedure, etc). Like the first type of report, the results are all properties 605 collected during the execution of each job step. In addition, as in the first type of report, the listing of the more detailed report may be color-coded to indicate the results and hyperlinks may be inserted to point to more detailed information within the diagnostics file 606.

In one embodiment, different report generators are used which not only format their output differently, but they gather and process the underlying data in very different ways. For example, one report generator may display the results of each step within a single job as described above. By contrast, another report generator may scan over all of the jobs over a specified time period (e.g., the last month) looking only at one particular step in each job, and produce summary information about the success or failure of that particular step over time. Various additional report generators may be employed while still complying with the underlying principles of the invention.

In one embodiment, a separate post processor is run for every job step to gather the information for that step. Thus, the user is provided a very concise description of the results of each step along with links to the more detailed information within the diagnostics file 606. Moreover, separating the reporting process into a data gathering step and a reporting step provides a more flexible architecture than prior systems. For example, new types of reports can easily be generated using the properties 605 and the diagnostics file 606 based on the specific needs of the end user.

In the foregoing description, for the purposes of explanation, numerous specific details are set forth in order to provide a thorough understanding of the present invention. It will be apparent, however, to one skilled in the art that the present invention may be practiced without some of these specific details. For example, while the embodiments described above focus on specific properties, the underlying principles of the invention may be employed using virtually any type of properties. Moreover, the central command server 200 may not necessarily be implemented as a separate physical "server." Rather the term "server" is used broadly herein to refer to a software module which may be executed on any machine or group of machines.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards.

What is claimed is:

1. A process automation system comprising a memory for storing program code and at least one processor for processing the program code to generate a multi-tier, hierarchical organization comprising:

one or more project objects containing data for one or more process automation projects designed by a user;

one or more job objects, each of the job objects associated with at least one of the project objects and defining procedures to be executed upon execution of one of the project objects;

one or more job step objects, each of the job step objects associated with one of the job objects, each of the job step objects specifying one or more commands to be executed by a specified one or more system resources within the process automation system;

one or more resource objects representing the one or more system resources for executing the automation projects, including the jobs and job steps associated with the automation projects;

wherein the program code, when executed by the processor, causes the additional operations of:

generating attachment data attaching a plurality of properties to the resource object, generating attachment data attaching a plurality of properties to the project objects, generating attachment data attaching a plurality of properties to the job objects, and generating attachment data attaching a plurality of properties to the job step objects, each of the properties having a value associated therewith, wherein at least some of the properties are generated and attached to the project objects, job objects, and job step objects at runtime, during execution of the project objects, job objects, and job step objects, respectively, wherein the properties attached to the resource object indicate a particular hardware/software platform on which to execute a particular project, job, and/or job step;

storing the attached properties with the associated values and attachment data;

receiving a request to execute one or more of the objects;

interpreting the attachment data to identify the properties attached to each of the one or more objects including interpreting the properties attached to the resource object to identify a particular hardware/software platform on which to execute one or more of the project objects, job objects, and job step objects; and modifying execution of the one or more of the objects within the process automation system using the values associated with the one or more properties.

2. The system as in claim 1 further comprising:

a central command server for managing the automation projects, including the job objects and job step objects associated with the automation projects and the resource objects identifying the resources on which each of the job step objects are executed.

3. The system as in claim 1 wherein generating and attaching properties at runtime comprises:

a first job step setting a property value during execution of the first job step, first job step attaching the property value to a second job step;

executing the second job step and dynamically applying the property value set by the first job step to the second job step.

4. The system as in claim 3 wherein the property value comprises an identity of a resource on which the second job step must be executed as a result of the first job step being executed on that resource.

5. The system as in claim 4 wherein the central command server further comprises property attachment logic to attach properties to each of the objects, each of the properties comprising a name/value pair.

6. The system as in claim 5 further comprising:

a relational database for storing the property values associated with each of the objects, the relational database storing the property values in a plurality of property sheets.

7. The system as in claim 6 wherein the property sheets are related to one another in a hierarchical manner representative of the hierarchical relationship of the project, job, job step, and resource objects.

8. A method implemented on a computer comprising a memory for storing program code and a processor for processing the program code to perform the operations of:

providing one or more project objects containing data for one or more process automation projects designed by a user;

providing one or more job objects, each of the job objects associated with at least one of the project objects and defining procedures to be executed upon execution of one of the project objects;

providing one or more job step objects, each of the job step objects associated with one of the job objects, each of the job step objects specifying one or more commands to be executed by a specified one or more system resources within the process automation system;

providing one or more resource objects representing the one or more system resources for executing the automation projects, including the jobs and job steps associated with the automation projects;

generating attachment data attaching a plurality of properties to the resource object, generating attachment data attaching a plurality of properties to the project objects, generating attachment data attaching a plurality of properties to the job objects, and generating attachment data attaching a plurality of properties to the job step objects, each of the properties having a value associated therewith, wherein at least some of the properties are generated and attached to the project objects, job objects, and job step objects at runtime, during execution of the project objects, job objects, and job step objects, respectively, wherein the properties attached to the resource object indicate a particular hardware/software platform on which to execute a particular project, job, and/or job step;

storing the attached properties with the associated values and attachment data;

receiving a request to execute one or more of the objects;

interpreting the attachment data to identify the properties attached to each of the one or more objects including interpreting the properties attached to the resource object to identify a particular hardware/software platform on which to execute one or more of the project objects, job objects, and job step objects; and modifying execution of the one or more of the objects within the process automation system using the values associated with the one or more properties.

9. The method as in claim 8 further comprising:

managing each of the automation projects, including the job objects and job step objects associated with the automation projects and the resource object identifying the resources on which each of the job step objects are executed within a central command server.

10. The method as in claim 8 wherein generating and attaching properties at runtime comprises:

a first job step setting a property value during execution of the first job step, first job step attaching the property value to a second job step;

executing the second job step and dynamically applying the property value set by the first job step to the second job step.

11. The method as in claim 10 wherein the property value comprises an identity of a resource on which the second job step must be executed as a result of the first job step being executed on that resource.

12. The method as in claim 11 further comprising:
attaching properties to each of the objects, each of the properties comprising a name/value pair.

13. The method as in claim 12 further comprising:
storing the property values associated with each of the objects within a relational database, the relational database storing the property values in a plurality of property sheets.

14. The method as in claim 13 wherein the property sheets are related to one another in a hierarchical manner representative of the hierarchical relationship of the project, job, job step, and resource objects.

15. A machine-readable medium having program code stored thereon which, when executed by a machine, causes the machine to perform the operations of:
providing one or more project objects containing data for one or more process automation projects designed by a user;
providing one or more job objects, each of the job objects associated with at least one of the project objects and defining procedures to be executed upon execution of one of the project objects;
providing one or more job step objects, each of the job step objects associated with one of the job objects, each of the job step objects specifying one or more commands to be executed by a specified one or more system resources within the process automation system;
providing one or more resource objects representing the one or more system resources for executing the automation projects, including the jobs and job steps associated with the automation projects;
generating attachment data attaching a plurality of properties to the resource object,
generating attachment data attaching a plurality of properties to the project objects,
generating attachment data attaching a plurality of properties to the job objects, and
generating attachment data attaching a plurality of properties to the job step objects, each of the properties having a value associated therewith, wherein at least some of the properties are generated and attached to the project objects, job objects, and job step objects at runtime, during execution of the project objects, job objects, and job step objects, respectively, wherein the properties attached to the resource object indicate a particular hardware/software platform on which to execute a particular project, job, and/or job step;
storing the attached properties with the associated values and attachment data;
receiving a request to execute one or more of the objects;
interpreting the attachment data to identify the properties attached to each of the one or more objects including interpreting the properties attached to the resource object to identify a particular hardware/software platform on which to execute one or more of the project objects, job objects, and job step objects; and
modifying execution of the one or more of the objects within the process automation system using the values associated with the one or more properties.

16. The machine-readable medium as in claim 15 including additional program code to cause the machine to perform the operations of:
managing each of the automation projects, including the job objects and job step objects associated with the automation projects and the resources object identifying the resources on which each of the job step objects are executed within a central command server.

17. The machine-readable medium as in claim 15 wherein generating and attaching properties at runtime comprises:
a first job step setting a property value during execution of the first job step, first job step attaching the property value to a second job step;
executing the second job step and dynamically applying the property value set by the first job step to the second job step.

18. The machine-readable medium as in claim 17 wherein the property value comprises an identity of a resource on which the second job step must be executed as a result of the first job step being executed on that resource.

19. The machine-readable medium as in claim 18 including additional program code to cause the machine to perform the operations of:
attaching properties to each of the objects, each of the properties comprising a name/value pair.

20. The machine-readable medium as in claim 19 including additional program code to cause the machine to perform the operations of:
storing the property values associated with each of the objects within a relational database, the relational database storing the property values in a plurality of property sheets.

21. The machine-readable medium as in claim 20 wherein the property sheets are related to one another in a hierarchical manner representative of the hierarchical relationship of the project, job, job step, and resource objects.

* * * * *